May 11, 1965     K. SCHAEFER     3,183,520
CINEMATOGRAPHIC CAMERA WITH SNAP-SPRING RELEASE MECHANISM
Filed July 25, 1960     3 Sheets-Sheet 1

INVENTOR.
KNUT SCHAEFER
BY
Toulmin & Toulmin
Attorneys

May 11, 1965 K. SCHAEFER 3,183,520
CINEMATOGRAPHIC CAMERA WITH SNAP-SPRING RELEASE MECHANISM
Filed July 25, 1960 3 Sheets-Sheet 2

INVENTOR.
KNUT SCHAEFER
BY
Toulmin & Toulmin
Attorneys

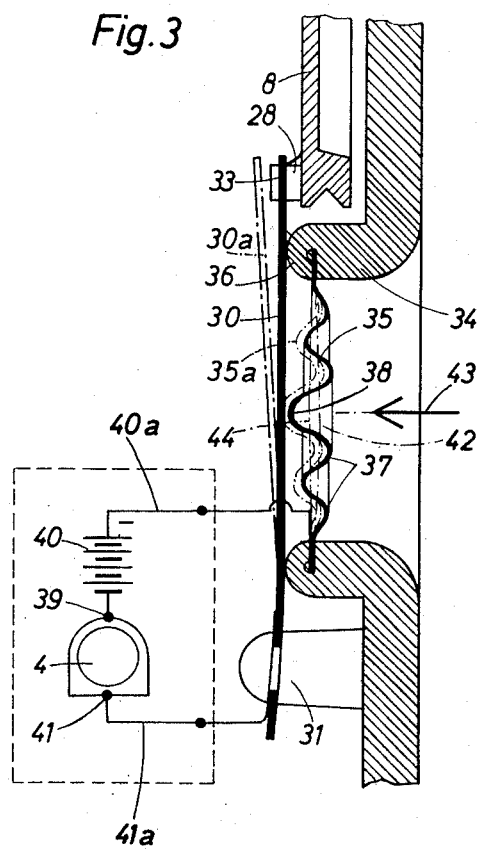

United States Patent Office 3,183,520
Patented May 11, 1965

3,183,520
CINEMATOGRAPHIC CAMERA WITH SNAP-SPRING RELEASE MECHANISM
Knut Schaefer, 65 Gotthelfstrasse, Munich, Germany
Filed July 25, 1960, Ser. No. 44,987
Claims priority, application Germany, July 30, 1959,
Sch 26,450
7 Claims. (Cl. 352—178)

The present invention relates to cinematographic cameras. More in particular, the present invention relates to cinematographic cameras equipped with a release mechanism controlled by a snap-spring device.

It will be noted that, in the present specification, the term "release mechanism" referes to both the release and the switch-off operation of the cinematographic camera. It is known in the art to provide release mechanisms for cinematographic cameras which are provided with a snap-spring device which latter makes the release operation independent from the speed and force of the manual operation. These known cameras usually provide a resilient device operated by a manually worked release member. The resilient device must be moved beyond a position of greatest tension or it must be so devised that, at a predetermined pressure exerted on the manually operated member, the resilient device snaps into the release position and returns into its initial position after manual operation is discontinued. This arrangement offers great advantages, particularly in connection with electric cinematographic cameras in which the release operation implies the mechanical release of the diaphragm shaft and the control of the camera motor.

These known arrangements suffer, however, from a number of considerable disadvantages. They provide for a connecting member between the manually operated release member and the switch members in the interior of the camera casing, consisting of a displaceable member projecting through the camera wall into the interior of the casing. This arrangement calls for guide members and sealing elements in order to protect the interior of the camera from extraneous matter as well as from light. The guide members do not have a sufficient degree of light-tightness and particular structure is required to protect the interior of the camera against undesirable light.

With the foregoing in mind it is the object of the present invention to provide a cinematographic camera with an improved snap-spring release mechanism which makes the guide and sealing elements and protective arrangements, required by the structure arrangement of the known art, unnecessary.

This object as well as further objects and advantages of the present invention, which will become apparent as the description thereof proceeds, are accomplished by the release mechanism for cinematographic cameras according to the invention consisting of a resilient membrane which is light-tightly mounted in a recess in the casing of the camera, which resilient membrane is capable of a snap-spring release and return action.

According to the invention the resilient membrane is mounted in a recess of the camera casing so as to be easily accessible from the outside to enable manual operation by pressure exerted against the membrane. The resilient membrane has a predetermined resiliency and pretension that, in its central position, its surface of resilient action coincides with its plane of pretension. The membrane is adapted to assume a first position which is its resting position in the absence of manual operation and it is located beyond the central position in outward direction with reference to the camera casing. It is further adapted to assume, in case of manual operation, a second, release position beyond the central position in inward direction with reference to the camera casing.

The membrane is so adapted that, whenever it has been moved beyond its central position towards this last-mentioned position by manual operation, the return force is produced in opposite direction, that is in the direction towards the first position tending to move the membrane back into its first position and actually moving the membrane into this first position whenever its manual operation is discontinued. The manual operation may simply consist of pressure exerted against the membrane from outside of the camera casing, for instance by pressing a thumb or other finger against the membrane. Preferably, the membrane has a circular and corrugated configuration.

The outwardly bulged configuration of the membrane in its initial position can be produced either by pretensioning the membrane when it is mounted in the camera casing, or by producing such a membrane having an outwardly bulged configuration. It will be apparent that, in the first instance, the return action, counteracting the force of manual operation, is present already in the initial or resting position.

Further features of the invention will become apparent from the detailed description.

The invention will be more fully appreciated upon the following description of the accompanying drawings, wherein FIGURE 1 is a longitudinally sectional view of a cinematographic camera according to the invention;

FIGURE 3 is an enlarged, fragmentary view of the release mechanism according to the invention, shown in the connection with a force diagram of the resilient membrane means.

Figure 1:
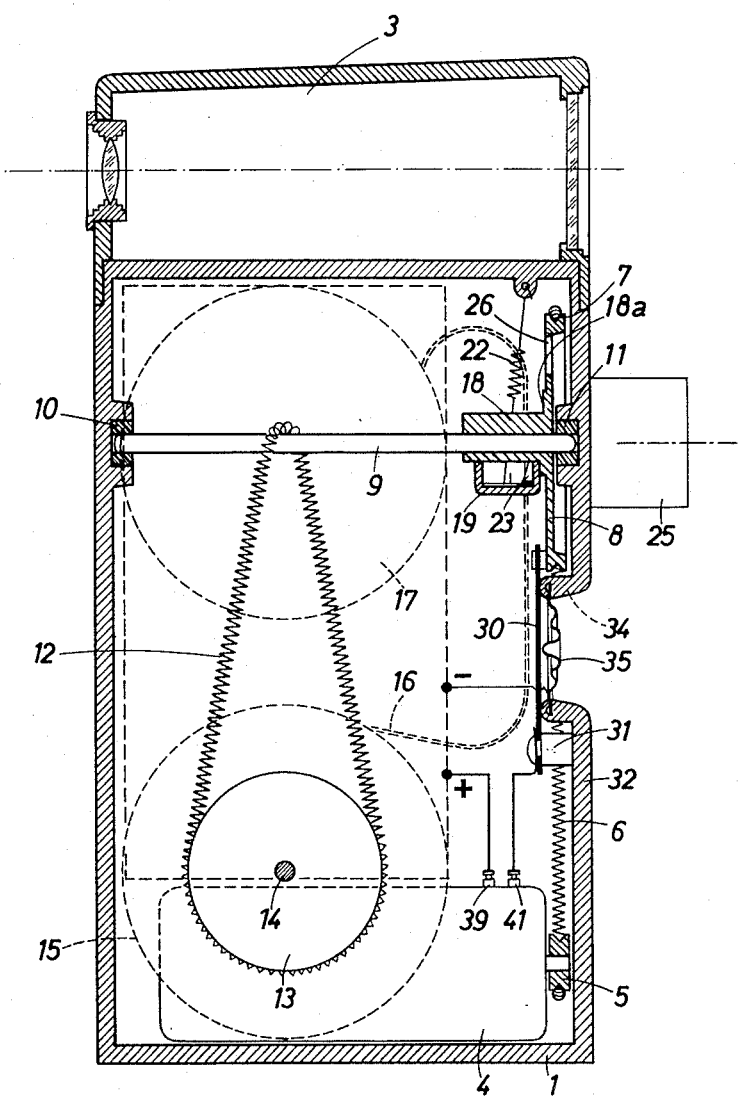

Referring now to the drawings more in detail, a camera casing 1 is closed by a cover 2 and supports a range finder structure 3. Casing 1 houses in its bottom portion an electric motor driving a pinion 5. An endless screw spring 6 is drivingly connected with pinion 5 and engages an annular groove 7 of a shutter disk 8. The shutter disk 8 is mounted on a shaft 9 which latter is positioned on bearings 10 and 11 in the camera casing. Shaft 9 is further drivingly engaged by another endless screw spring 12. Screw spring 12 also engages a wheel 13 which latter is mounted on the shaft 14 of take-up reel 15. The feed reel is designated with 17, with a film strip such as 16 moving between reels 15 and 17. The electric motor 4 drives shaft 9 via pinion 5, spring 6 and disk 8, and shaft 9, in turn, drives take-up reel 15 via spring 12, wheel 13 and shaft 14.

Figure 2:
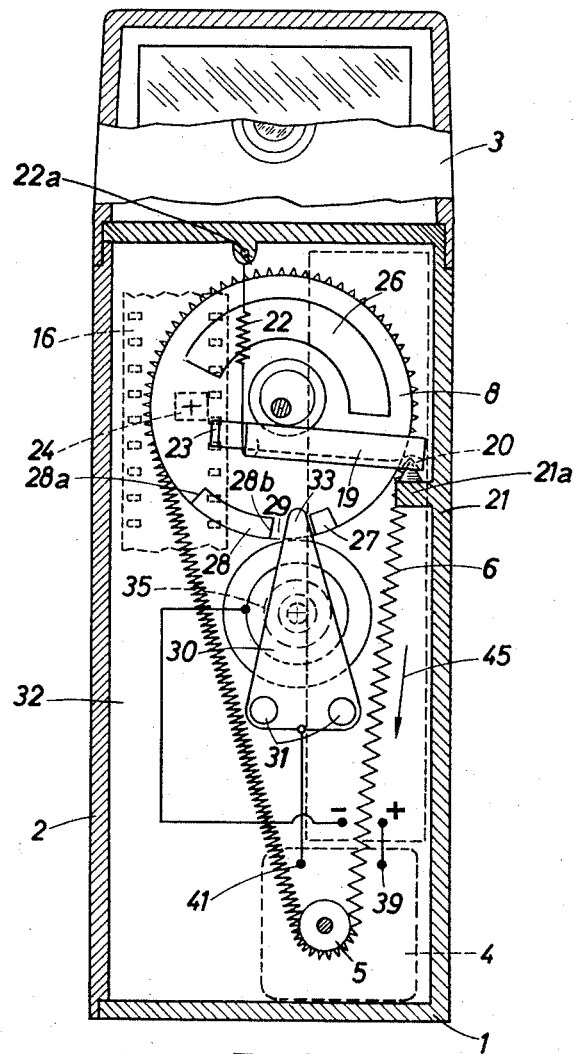
FIGURE 2 is a cross-sectional view of a cinematographic camera according to the invention.

The shutter disk 8 has an eccentric hub 18 with a collar portion 18a and is associated with a frame-like gripper 19 having a gripper tooth 23. The gripper 19 is positioned on a conical bearing 20 mounted on a flange 21a of camera side wall 21. A tension spring 22 is connected at one end to the casing as at 22a, and with its opposite end acts on gripper 19 urging the same against hub 18 and against collar portion 18a of the latter. Due to this arrangement the gripper can pivot about conical bearing 20 both vertically and horizontally. The gripper tooth 23 of gripper 19 is adapted to engage and disengage the perforations of film strip 16, as will be seen in FIGURE 2, and, when moving both vertically and horizontally thus causes a discontinuous displacement of the film strip; the gripper 19, is actuated by eccentric hub 18 on shutter disk 8, impelled by motor 4. When so moved, the film strip 16 passes behind window 24. During the stationary intervals of the film strip, the diaphragm continuous to rotate as driven by motor 4, and during these intervals the exposure opening 26 in the shutter disk 8 passes over the film strip, causing exposure to light rays passing through objective 25.

According to the invention, the cinematographic camera has release means comprising a snap-spring mechanism characterized by the provision of a resilient membrane 35. For mounting the membrane 35 the camera has a recess defined by a pair of inwardly extending flange portions 34 of the camera front wall 32 below the objective 25. The membrane is mounted on the flange portions 34, for example via a bulge portion 36, by means of flanging, riveting pressing, or another suitable connection, so as to establish a light-tight closure with the camera casing.

The membrane is preferably circular shaped and has a corrugated configuration, as will be noted in FIGURE 3, with the corrugations as at 37 extending annularly and centrically. Furthermore, the membrane may have a central, inwardly extending contact nose portion 38.

The membrane cooperates with a counter contact of a locking mechanism comprising the following structure: The shutter disk 8 peripherally bears a stop member 27 and a cam 28. The stop member 27 has a somewhat greater height than cam 28. Cam 28 has a wedge-shaped cross-section in peripheral extension, and rises from its one end 28a to its other end 28b in the plane of shutter disk 8 in the way of a spiral. The counter contact cooperating with membrane 35 consists, e.g. of a triangular blade spring 30. Its one, larger end is connected with the front wall 32 of the camera, e.g. by rivets 31 of insulating material, whereas its pointed, free end 33 is adapted to assume a locking position in the interspace 29 between stop member 27 and cam 28. In its resting position, blade spring 30 is in contact with flange portions 34.

In the locking position of the membrane 35, indicated by the bold line in FIGURE 3, the bulge portion 36 of the membrane is in contact with triangular blade spring 30, and the end 33 of the latter is positioned in interspace 29 between stop member 27 and cam 28, thereby locking shutter disk 8 with respect to either sense of rotation. In this locked position, the membrane 35 is untensioned and contact nose 38 is spaced from blade spring 30 by a distance of about 0.5 to 1 millimeter.

Turning now to the electric connection between the resilient membrane and the counter contact, motor 4 has a first terminal 39 connected with the positive pole of a current source, e.g. battery 40, and a second terminal 41 connected with blade spring 30 via lead 41a. The negative pole of battery 40 is connected with the resilient membrane 35 via lead 40a.

It will be noted that the resilient membrane 35 may have a cover layer of insulating material to assure insulation with respect to the operator of the camera. In addition, insulation may be provided relative to the metallic casing of the camera, consisting of insulating disks or the like suitable insulation means, not shown.

The membrane 35 is operated manually, for example by pressing against the surface of the membrane accessible through the space between flanges 34. In the absence of such manual actuation, the surface of resilient action of the membrane is indicated by line 42 in FIGURE 3. As soon as the membrane is manually actuated by pressing against it in the direction of arrow 43, portion 38 contacts blade spring 30 and the circuit to motor 4 is closed. A short period later the surface of resilient action of the membrane passes the plane of pretension 44 with the resulting resilient force of manual operation suddenly decreasing, as the resetting force of spring 30 is counteracted by the snap action of the membrane, so that the membrane snaps into position 35a, thereby moving blade spring 30 into position 30a, wherein portion 33 is removed from interspace 29 and shaft 9 is released. It will be noted that motor 4 has already been actuated, and the running motor has already tensioned spring 6 in the direction indicated by arrow 45 in FIGURE 2. By the time shaft 9 with shutter disk 8 are released, spring 6 has been pretensioned to such extent, that shutter disk 8 is abruptly accelerated. It turns in the clockwise sense and sufficient distance is available for reaching the necessary speed by the time the first exposure commences.

For terminating the operation of the camera, the manually exerted pressure against the membrane 35 is discontinued, thereby allowing the portion 33 of blade spring 30 to move into the path of wedge-shaped cam 28, whereafter blade spring 30 presses the membrane beyond its central position, and the latter then snaps back to its initial position, thereby switching off motor 4. Although portion 33 comes to rest against stop member 27, the stopping force to be exerted by the latter is comparatively small, as most of the braking forces are supplied by the springs 6 and 12 between diaphragm shaft 9 and motor 4.

It will be understood that this invention is susceptible to modification in order to adapt it to different usages and conditions and, accordingly, it is desired to comprehend such modifications within this invention as may fall within the scope of the appended claims.

What I claim is:

1. In a cinematographic camera having a camera casing housing means for advancing the film, the improvement comprising: means defining a recess in said casing, a release mechanism in said casing for said advancing means, a resilient membrane light-tightly mounted in said recess capable of being moved from a resting position into a release position thereby passing through a range of decreasing resilient force wherein said membrane actuates said release mechanism, there being means including said membrane tending to return it into its resting position by snap spring action.

2. The structure in claim 1, with said membrane having a circular, corrugated configuration.

3. The structure in claim 1, with said camera casing having a pair of inwardly extending flange portions defining said recess, with said membrane being mounted on said flange portions.

4. In a cinematographic camera having a camera casing housing means for advancing the film, the improvement comprising: means defining a recess in said casing, a release mechanism for said film advancing means, a resilient membrane light-tightly mounted in said recess of said camera casing so as to be accessible from outside for manual operation, said resilient membrane having a resting position in which the plane of resilient action is outwardly disposed with respect to its predetermined plane of pretension, said membrane being capable of being moved by an outer inwardly directed force so that its plane of resilient action passes beyond said plane of pretension towards a second position, and means in said casing engaged by said membrane when passing through said plane of pretension for actuating said release mechanism, said membrane providing outwardly directed snap action from said second to said resting position when said outer force is being removed.

5. In a cinematographic camera the combination comprising: a casing; inwardly bent flange means in said casing defining a recess; a motor in said casing; a shutter disc in said casing rotatably and drivingly connected to said motor; stop means on said shutter disc rotating therewith; releasable means in said casing capable of engaging with said stop means for stopping said shutter discs; circuit means including actuatable switching means for supplying said motor with electric current; and a normally outwardly bent spring membrane mounted at said flange across said recess, said spring membrane passing through a range of decreasing resilient force when an inwardly directed actuating force is exerted thereupon, whereby said membrane when passing through said range first closes said switching means and then actuates said releasable means for disengaging from said stop means, said membrane returning to its normal position by snap action upon being relieved from said actuating force whereby first said stop means is re-engaged by said releasable means and then said switching means is being opened.

6. In a cinematographic camera the combination comprising: a casing, inwardly bent flange means in said casing defining a recess; a normally outwardly bent spring-membrane mounted at said flange across said recess; a motor in said casing; a shutter disc in said casing rotatably and drivingly connected to said motor, stop means on said shutter disc rotating therewith: and a spring in said casing normally resting against said flange and in engagement with said stop means but disengaged from said membrane, said membrane being capable of engaging said spring for releasing said stop means upon exertion of an inwardly directed actuating force, said membrane upon being urged inwardly passing through a range of decreasing resilient force, wherein said membrane causes said spring to disengage from said stop means, said membrane returning to its normal position by snap action upon being relieved from said actuating force.

7. In a cinematographic camera the combination comprising: a casing, inwardly bent flange means in said casing defining a recess; a normally outwardly bent spring-membrane mounted at said flange across said recess; a motor in said casing; a shutter disc in said casing rotatably and drivingly connected to said motor; stop means on said shutter disc rotating therewith; a spring in said casing normally resting against said flange and in engagement with said stop means but disengaged from said membrane, and circuit means including said membrane and said spring for supplying electric current to said motor when said membrane engages said spring, said membrane being capable of engaging said spring for releasing said stop means upon exertion of an inwardly directed actuating force, said membrane upon being urged inwardly passing through a range of decreasing resilient force, wherein said membrane first engages said spring and then causes said spring to disengage from said stop means, said membrane returning to its normal position by snap action upon being relieved from said actuating force.

References Cited in the file of this patent

UNITED STATES PATENTS

| | | |
|---|---|---|
| 2,682,192 | Bolsey | June 29, 1954 |
| 2,812,402 | Dixon | Nov. 5, 1957 |
| 2,854,536 | Beer | Sept. 30, 1958 |
| 2,901,143 | Pope | Aug. 25, 1959 |
| 2,919,320 | Edwards | Dec. 29, 1959 |
| 2,943,532 | Hashimoto | July 5, 1960 |

FOREIGN PATENTS

| | | |
|---|---|---|
| 201,975 | Switzerland | Mar. 16, 1939 |